April 12, 1966     B. K. SLONNEGER     3,246,183
ELECTRIC WINDING PROTECTION

Filed Sept. 12, 1962     3 Sheets-Sheet 1

Bruce K. Slonneger,
Inventor.
Koenig, Pope, Senniger,
and Powers,
Attorneys.

April 12, 1966   B. K. SLONNEGER   3,246,183
ELECTRIC WINDING PROTECTION
Filed Sept. 12, 1962   3 Sheets-Sheet 2
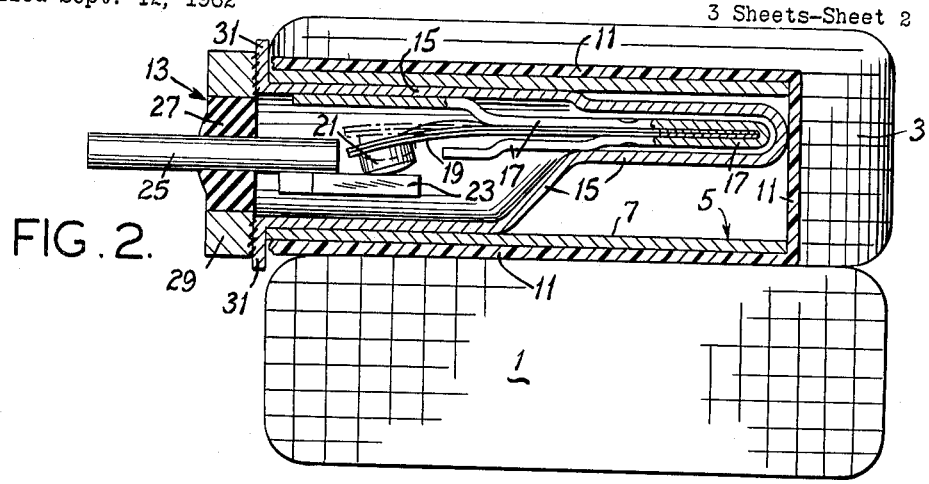
FIG. 2.
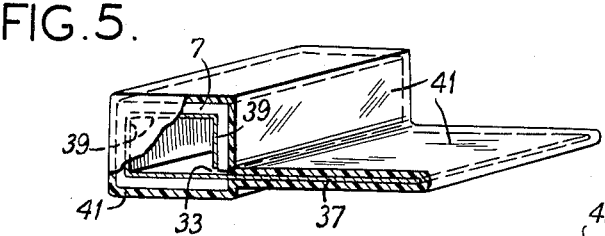
FIG. 5.
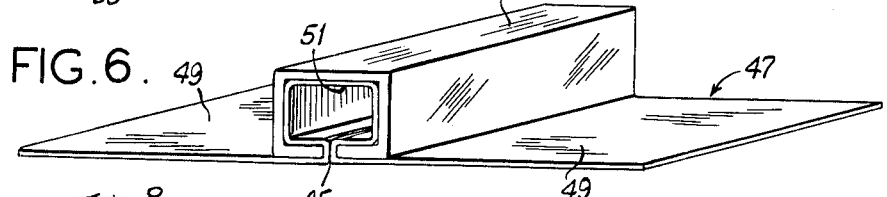
FIG. 6.
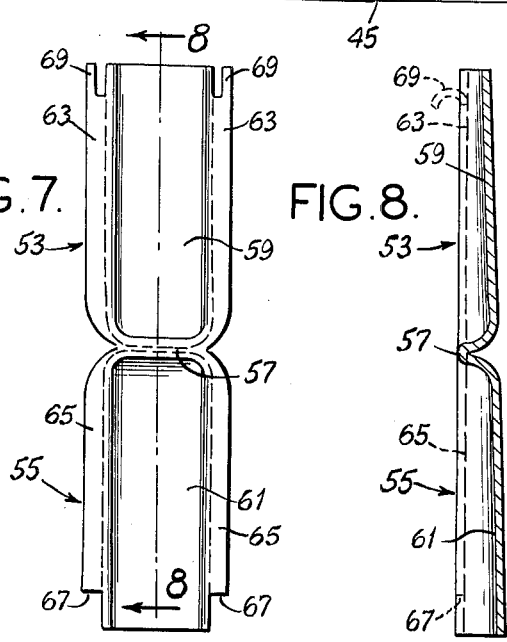
FIG. 7.   FIG. 8.
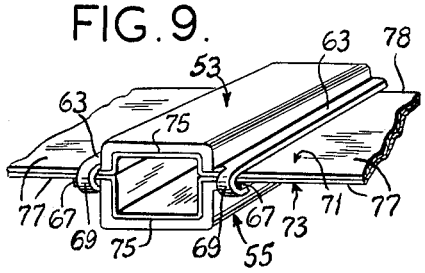
FIG. 9.
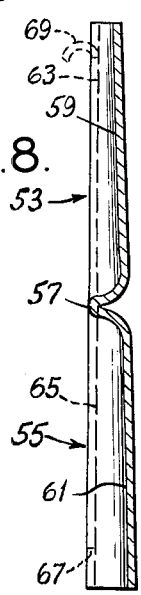
Bruce K. Slonneger,
Inventor
Koenig, Pope,
Senniger and Powers,
Attorneys.

April 12, 1966  B. K. SLONNEGER  3,246,183
ELECTRIC WINDING PROTECTION
Filed Sept. 12, 1962  3 Sheets-Sheet 3
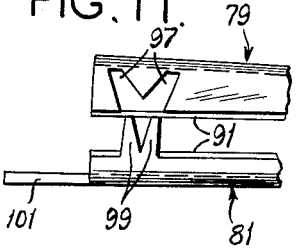
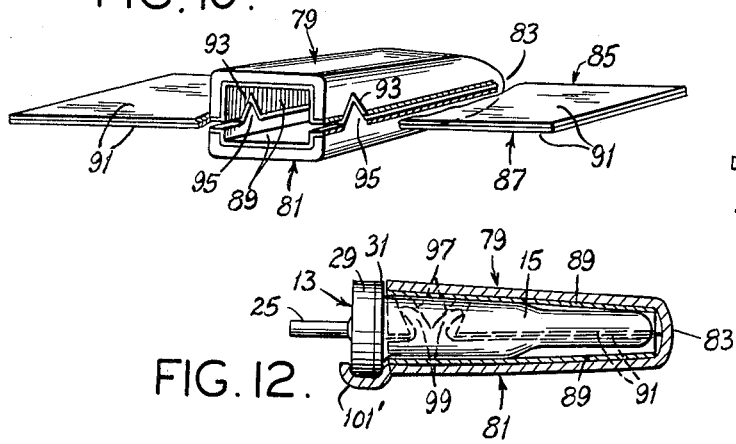
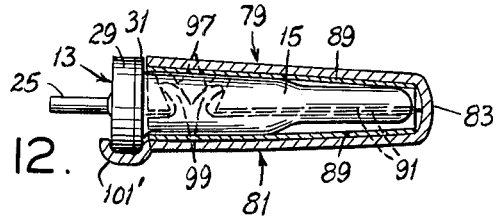
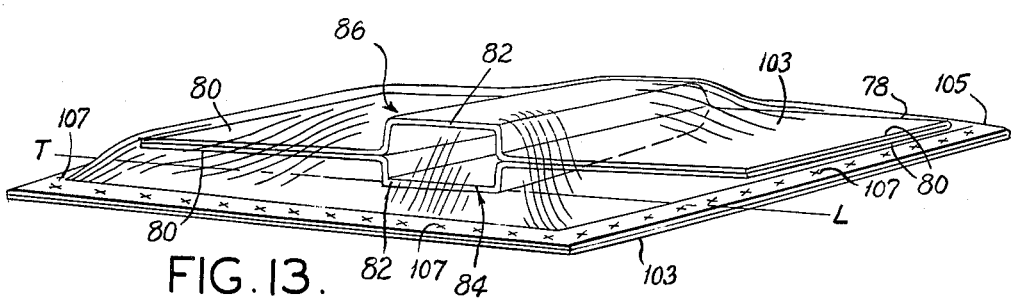
Bruce K. Slonneger,
Inventor.
Koenig, Pope, Senniger and Powers,
Attorneys.

United States Patent Office 3,246,183
Patented Apr. 12, 1966

3,246,183
ELECTRIC WINDING PROTECTION
Bruce K. Slonneger, Dayton, Ohio, assignor to Texas Instruments Incorporated, Dallas, Tex., a corporation of Delaware
Filed Sept. 12, 1962, Ser. No. 223,207
5 Claims. (Cl. 310—68)

This invention relates to electric winding protection, and with regard to certain more specific features, to means for locating thermostatic switches in motor windings and the like which the switches serve to protect.

Among the several objects of the invention may be noted the provision of an efficient heat-conductive receptacle in motor windings and the like adapted to receive a thermostatic protective switch for said windings; the provision of a receptacle of the class described adapted to be emplaced during construction of the windings without (if desired) the switch therein, whereby the switch is not physically damaged nor subjected to decalibration during operations for the winding such as dipping, forming, baking or the like; and the provision of an improved method for winding protection. Other objects and features will be in part apparent and in part pointed out hereinafter.

The invention accordingly comprises the elements and combinations of elements, steps and sequence of steps, features of construction and manipulation, and arrangements of parts which will be exemplified in the constructions and methods hereinafter described, and the scope of which will be indicated in the following claims.

In the accompanying drawings, in which several of various possible embodiments of the invention are illustrated, FIG. 1 is an end view, partly broken away, showing application of one form of the invention to motor windings diagrammatically illustrated;

FIG. 2 is an enlarged cross section taken on line 2—2 of FIG. 1 but in addition showing an inserted switch;

FIGS. 5 and 6 are isometric views illustrating third and fourth forms of the invention, respectively;

FIG. 7 is a plan view of a fifth form of the invention in an open condition;

FIG. 8 is a cross section taken on line 8—8 of FIG. 7;

FIG. 9 is a view showing the fifth form of the invention in closed condition;

FIG. 10 is an isometric view like FIG. 9, showing a sixth form of the invention;

FIG. 11 is an enlarged fragmentary detail showing a seventh modification;

FIG. 12 is a longitudinal section showing the use of the FIG. 11 modification; and FIG. 13 is an isometric view showing the eighth form of the invention.

Corresponding reference characters indicate corresponding parts throughout the several views of the drawings.

It is desirable to place motor-protective switches in as efficient as possible heat-conductive relationship with the windings of a motor or the like to be protected. To this end it is desirable to embed the switch among the windings. If this is done prior to the usual forming, dipping and baking operations, any switches subjected to such operations may be subject to physical damage or have their calibrations destroyed. Embedment after winding, forming, dipping and baking is difficult and leads to a less efficient heat-conductive relationship between the switch and the windings. It is desirable that any switch-mounting and heat-conductive means be inserted prior to at least some if not all of the winding, forming, dipping and baking operations, in order to obtain the most efficient heat-conductive relationship and avoid undesirable damage or alterations in the operating characteristics of the motor protective switch, which might otherwise result if the switch were permanently incorporated with the heat-conductive means prior to the motor winding operations. This also involves providing some protective means to prevent foreign material from entering the mounting means, whether or not the switch is mounted therein during winding, dipping and baking. The switch is preferably not so mounted until these operations have been completed.

Figure 1:
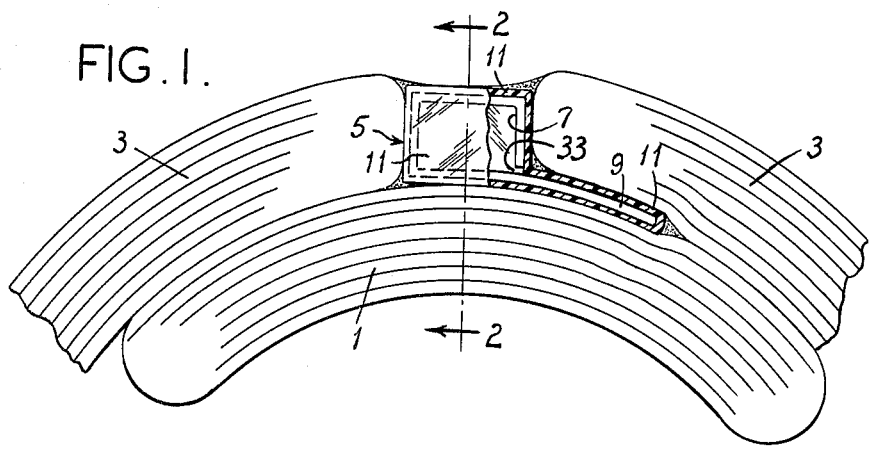

Referring now more particularly to FIGS. 1 and 2, numerals 1 and 3 indicate windings which, for example, may be typical start and run windings of a motor. Inserted among the windings is a receptacle shown in general at numeral 5. The receptacle 5 comprises a bent metal strip of wall thickness such that its form, after bending into the tubular form shown, will be maintained, preferably in a slightly springy manner. The sheet is cross-sectionally shaped to form a tubular or socket portion 7 of rectangular form, assuming that a protective switch of the rectangular cross section is later to be inserted therein. Other cross-sectional shapes may be used, as demanded by switch shapes. The tube of this form is open at both ends. The sheet is extended to form a heat-conductive tab 9. It is composed of a heat-conductive metal such as, for example, copper or aluminum, which is efficiently heat conductive and sufficiently ductile to permit of convenient bending of the tab 9 in the thicknesses desirable for the socket 7. Before insertion into the motor windings, the sheet (in the loop form described) is encased in a protective sheath 11 of strong heat-conductive but electrically insulating material, such as Mylar. Mylar is a trademark for a chemically inert highly durable polyethylene terephthalate resin material. Such inert material is employed to withstand contact with the usual varnishes and the like into which the windings are dipped prior to baking. Such wrapping is also of a nature to withstand the usual backing or setting temperatures. The wrapper completely surrounds the socket portion 7, including its open ends and the tab 9. It is comparatively thin so as not to interfere with good heat transmission. A few thousandths of an inch is an appropriate thickness.

The wrapped assembly 5 is introduced among the motor windings 1, 3 at the time they are wound. The tab 9, being bendable in its sheath, may readily be formed for convenient interleaving or sandwiching between windings as they are formed. After the winding and forming operations, the windings, with the included wrapped socket assembly, may be dipped in suitable flowable insulating varnish or the like and baked so as to harden or set the varnish. The wrapping 11 prevents the varnish from entering the tubular socket 7. The manner in which the varnish or the like engages the wrapping is suggested by stippling. It will be understood that the manner of insertion among the windings as illustrated is only one of many. For example, loops of the windings may be wrapped about the receptacle, including its tab 9.

After the windings have been completed, a portion of the sheath 11 may be torn or cut away adjacent one end of the tubular part 7. This provides for introduction of the appropriate protective switch, which is shown in general at numeral 13. This comprises an electrically and thermally conductive casing 15 in the interior of which is mounted a conductive support 17 for a snap-acting bimetallic switch blade 19, carrying a contact 21. Contact 21 is engageable and disengageable with a contact 23 carried by a terminal 25 which is supported by insulation 27 in a conductive ring 29 attached to a flange 31 (as by welding) of the conductive casing 15. The casing seals the interior of switch 13. The sheet which forms the socket 7 has been left with a slot at 33 (FIG. 1). This provides enough of a springy characteristic to the tubular portion 7 so that a snug telescopic fit will be obtained with the switch 13. The switch 13 is suitably conductively connected with the circuit supplying the motor windings such that when the switch is closed this circuit will be excited, and deexcited when the switch is open. The Mylar or like sheet is quite thin, as for example ten thousandths of an inch more or less, so that it does not constitute any substantial obstruction to heat flow across it.

Figure 3:
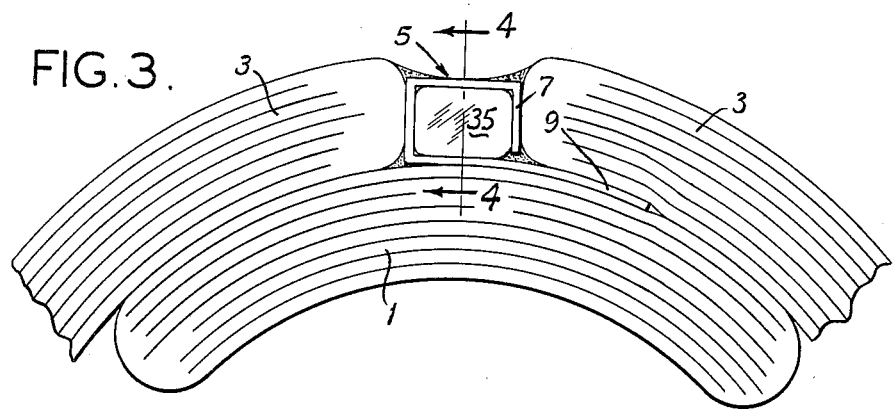
FIG. 3 is a view similar to FIG. 1, showing a modification of the FIG. 1 form.
Figure 4:
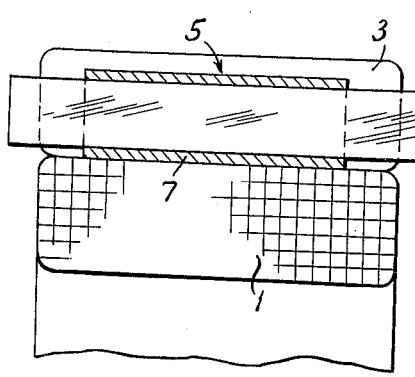
FIG. 4 is a vertical section taken on line 4—4 of FIG. 3.

In FIGS. 3 and 4, like numerals designate like parts. In this case the wrapping 11 is not employed. Rather, a suitable rectangular plug, such as shown at 35, is inserted into the tubular portion 7 at the time that the receptacle 5 is organized with the motor windings and prior to forming, dipping and baking. This plug may be composed of wood, plastic, metal, rubber or the like. After the forming, dipping and baking have been completed, the plug is removed, after which a switch such as 13 may be inserted, as above described. In this form of the invention the wrapping may be omitted.

In FIG. 5 is shown a modification of the pocket-forming assembly. In this case the tubular portion 7 is retained but the tab 9, as an integral part of it, is eliminated. Substituted therefor is a strip of heat-conductive metal 37 which extends through the slot 33 and extends as a liner 39 within the tubular portion 7. The strip 37 is thinner than the tubular portion 7 and hence more flexible. The whole is enclosed in a suitable wrapping 41, such as above described. The material of the elements 37, 39 should be as ductile and soft as possible, such as, for example, dead soft copper or aluminum, to provide for an inner wall of the receptacle which will better conform itself to small variations in shapes of switch assemblies 13. The ductility and thinness of this liner material and the tab 37 allows the latter to be more freely bent to conform to variations in the motor winding shapes.

In FIG. 6 is shown another form of the invention in which the rectangular metal tubular element 43, instead of being slotted at one corner, is slotted in the mid portion of one wall, as indicated at 45. This slot is just wide enough to accommodate two thicknesses of the ductile liner and heat-conductive tab material 47. In this case, two bendable tabs 49 are formed, the inner portions of which enter the slot 45 and again form a liner portion 51 within the tubular part 43. This construction, by means of the two tabs 49, provides for a greater area for interleaving with the coil windings and for a greater heat-conducting path.

In FIGS. 7–9 is shown another form of the invention. As illustrated in FIGS. 7 and 8, this is manufactured by first stamping a heat-conductive sheet in the form of two trough-shaped pockets 53 and 55, which has a bendable connection 57. The pockets taper, as shown at 59 and 61, being open at their ends opposite the bendable connection 57. The stamping is provided with flanges 63 and 65, respectively. Flanges 65 are notched, as shown at 67. Flanges 63 are provided with conjunctive bendable fingers 69. By hinging the leaves 53 and 55 at the bendable connection 57, they may be brought together to form a complete tapering rectangular socket, as shown in FIG. 9. Before the leaves 53 and 55 are brought completely together, folded ductile heat-conductive metal sheets 71 and 73 are inserted between them, being separated and shaped to provide inner liner portions 75 and outer transverse multi-ply tab portions 77. The fold appears at 78. It may be omitted and separate sheets employed. After the sheets have been inserted as shown, the fingers 69 are bent over the end of the flanges 65, which hold together the leaves 53 and 55 and lock the sheets 71 and 73 in position. The advantage of a tapering socket with the soft ductile metal liner portions 75 is that a snug fit is readily obtainable for the switch to be inserted, particularly when it is of a tapering form.

In FIG. 10 is shown a modification of the FIG. 9 form. In this case, trough-shaped pockets 79 and 81, bendably hinged at 83, are adapted to receive therebetween ductile heat-conductive (in this case, separate) sheets 85 and 87 to form a liner portion 89 and multi-ply tab portions 91. The tab portions 91 are broken away at their connections with the liner portion 89 to show a difference over the FIG. 9 form. In the FIG. 10 form the transverse flanges on the troughs are omitted, along with their interlocking fingers. Instead, the sides of portion 79 are notched, as shown at 93, and the opposed sides of the portion 81 are provided with conjugate points 95. The points 95 cut through the ductile sheets 85 and 87 when the leaves 79 and 81 are bent into juxtaposition, thereby anchoring them while leaving a somewhat springy relationship between the leaves 79 and 81 for forming a somewhat springy engagement with the switch to be inserted. If this springy feature is not wanted, the portions 93 and 95 may be spot-welded.

In FIGS. 11 and 12 is illustrated another form of the invention similar to that shown in FIG. 10, like numerals designating like parts. In this case the sides of the portion 79 are angularly notched, as shown at 97, for the reception of anchored tongues 99 extending from the sides of the other portion 81. When the leaves 79 and 81 are pushed together, the tongues 99 enter and spread and automatically lock within the notches 97, as illustrated by the dotted lines in FIG. 12. In this case a long tongue 101 may be provided at the end of the member 81, which after insertion of the switch 13 may be bent around a flanged portion thereof as shown at 101'. Thus not only is the switch wedged into tight heat-conductive engagement with the liner portions 89, but it is positively held in its inserted position.

It will be understood that in all forms of the invention the socket- and tab-forming subassemblies may be wrapped or located in a sheath, as illustrated in FIG. 13. In this figure the socket- and tab-forming assembly, used for illustration, is made by folding a thin sheet of heat-conductive material on itself as at 78 (copper, for example). This forms layered sheets 80, central portions of which are deformed as shown at 82 to form a pocket 84. The result is a tab subassembly numbered 86 in general. As shown in FIG. 13, the pocket and tab subassembly 86 has been interleaved between areas of a protective sheet material 103, such as Mylar or the like, folded at 105 and heat-sealed around three margins as shown at 107. A part forms a tear strip beyond line TL. The assembly thus wrapped (with or without a removable filler plug in the pocket 84) may then be inserted in the motor windings during their formation, after which forming, dipping, varnishing and baking may take place. Whether or not such a plug is used depends upon the rigidity of the subassembly 86, which in turn depends upon the thickness of the sheet from which it is made. Care should be taken that a portion of the sheath, or what may be referred to as a bag, shall be left free, so that it may finally be torn along the line TL adjacent the open end of the contained switch-receiving pocket or socket. Thereafter the switch may be inserted into the exposed pocket, after removal of the plug (if used) therein. While it is preferable for reasons above given that a thermostatic switch such as 13 be not located in the pocket assembly within the bag during coil winding, forming, dipping and baking, this is not precluded.

An advantage of the double-tabbed socket arrangements such as shown in FIGS. 6–13 (over the single-tab arrangement of FIGS. 1–5) is their increased ability to transmit heat from the windings to the switch. The multi-ply tab layers such as shown in FIGS. 9–13 have the additional advantage that may be splayed and individually interleaved or sandwiched between different motor winding layers so as to receive heat from several planes in the windings.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A socket-forming member for supporting a thermostatic switch in electrical windings, comprising several layers of a ductile heat-conductive sheet metal, opposed trough-shaped metallic members sandwiching said layers, said layers forming a deformable liner within the trough-shaped members and extending outwardly therefrom between the members to form heat-conductive tabs to be interleaved in electrical windings, and holding means between said trough-shaped members.

2. A socket-forming member according to claim 1, wherein said holding means comprises a bendable portion forming an end closure and a gripping portion disposed near the opposite ends of said trough-shaped members.

3. A socket-forming member according to claim 2, wherein said gripping portion is adapted to pierce said layers to hold them.

4. A socket-forming member according to claim 3, including a bendable portion near the gripping portion adapted to hold a switch located in the trough-shaped members.

5. A socket-forming member according to claim 1, wherein said holding means comprises notched portions on one trough-shaped member and fingers on the other trough-shaped member engageable therein.

References Cited by the Examiner
UNITED STATES PATENTS

| | | | |
|---|---|---|---|
| 2,682,005 | 6/1954 | Hemphill et al. | 310—68 |
| 2,712,083 | 6/1955 | Armstrong | 310—68 |
| 3,084,418 | 4/1962 | Procopio | 29—155.5 |
| 3,103,737 | 9/1963 | Elsworth | 29—155.5 |
| 3,127,531 | 3/1964 | Tothero | 310—68.3 |
| 3,131,322 | 4/1964 | Pleiss et al. | 310—68.3 |
| 3,135,883 | 6/1964 | Phillips | 310—68 |

ORIS L. RADER, *Primary Examiner.*
MILTON O. HIRSHFIELD, *Examiner.*